United States Patent
Pizzimenti et al.

[15] 3,697,157
[45] Oct. 10, 1972

[54] MOTOR VEHICLE ALL-WEATHER FORWARD VIEW MIRROR

[72] Inventors: Roger Philip Pizzimenti, 1725 S. W. 72 Court, Miami, Fla. 33155; James Ware Satcher, 12204 S. W. 27 Street, Miami, Fla. 33165

[22] Filed: May 10, 1971

[21] Appl. No.: 141,840

[52] U.S. Cl. ...................... 350/302, 350/61, 350/63
[51] Int. Cl. ........................... B60r 1/10, G02b 5/08
[58] Field of Search .................. 350/302, 301, 61, 63

[56] References Cited

UNITED STATES PATENTS 2,674,921  4/1954  Williams ................... 350/302

FOREIGN PATENTS OR APPLICATIONS 1,035,499  7/1958  Germany .................... 350/63

Primary Examiner—David Schonberg
Assistant Examiner—John W. Leonard

[57] ABSTRACT

A forward view mirror system which provides a motor vehicle driver with maximum visibility during inclement weather (rain, sleet, snow, etc.). The system includes a first mirror located above the driver's head in a forward view chamber and positioned to reflect an image of the road in front of the vehicle to a second adjustably mounted mirror located directly in front of the driver, a high pressure air chamber including a forwardly directed duct inlet which collects air and precipitation during the forward movement of the vehicle, and a drain duct which evacuates moisture from the high pressure air chamber. The moisture-free air then enters a high velocity air chamber to a duct outlet above the forward view opening and is redirected downwardly to form an air boundary layer which prevents precipitation from reaching the first mirror. Reciprocating wipers remove any moisture which may collect upon the reflecting surface of the first mirror and outer surface of the clear glass panel located above the driver's head.

1 Claim, 6 Drawing Figures

PATENTED OCT 10 1972 3,697,157

INVENTOR.
BY James Ware Satchel Jr
Roger Philip Pizzimenti

MOTOR VEHICLE ALL-WEATHER FORWARD VIEW MIRROR

The invention relates to providing the motor vehicle driver with maximum visibility during inclement weather (rain, sleet, snow, etc.) thereby increasing the motorist's margin of safety. The object of the invention is to provide the motor vehicle driver with an alternate method of receiving a broad clear view of the road ahead. The intent of the invention is to eliminate the need of viewing through a windshield, which has been impaired by impact or adherence of moisture upon the viewing area, while still maintaining a true perspective of the road ahead.

One form of the invention is illustrated in the accompanying drawings. It should be noted that the form of the safety road viewer has not been presented as a modular unit but rather as an integral part of the motor vehicle design.

Figure 6:
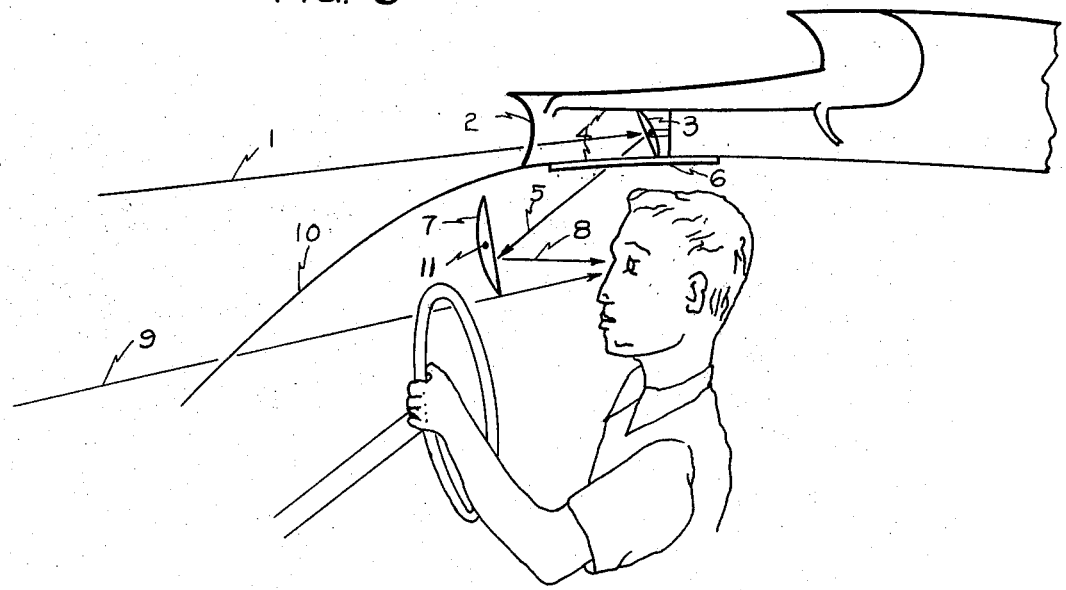
FIG. 6 is a partial side view of the safety road viewer showing the transmission pattern of the reflected image of the road, ahead of the motor vehicle, to the viewing driver.

(See FIG. 6.) A broad image of the road ahead 1 enters the unobstructed forward view chamber opening 2 and projects upon the surface of the mirror 3 which is mounted in the forward view chamber 4. The image 5 is then reflected from the mirror 3 through the clear glass panel 6 to the driver viewing mirror 7.

The motor vehicle driver than proceeds to integrate the image 8 from the driver viewing mirror 7 with the view of the road ahead 9, as seen through the motor vehicle windshield 10. This procedure is accomplished by adjusting the height, lateral, and angular pitch of the mirror 7 which is mounted on two universal joint supports 11.

Figure 4:
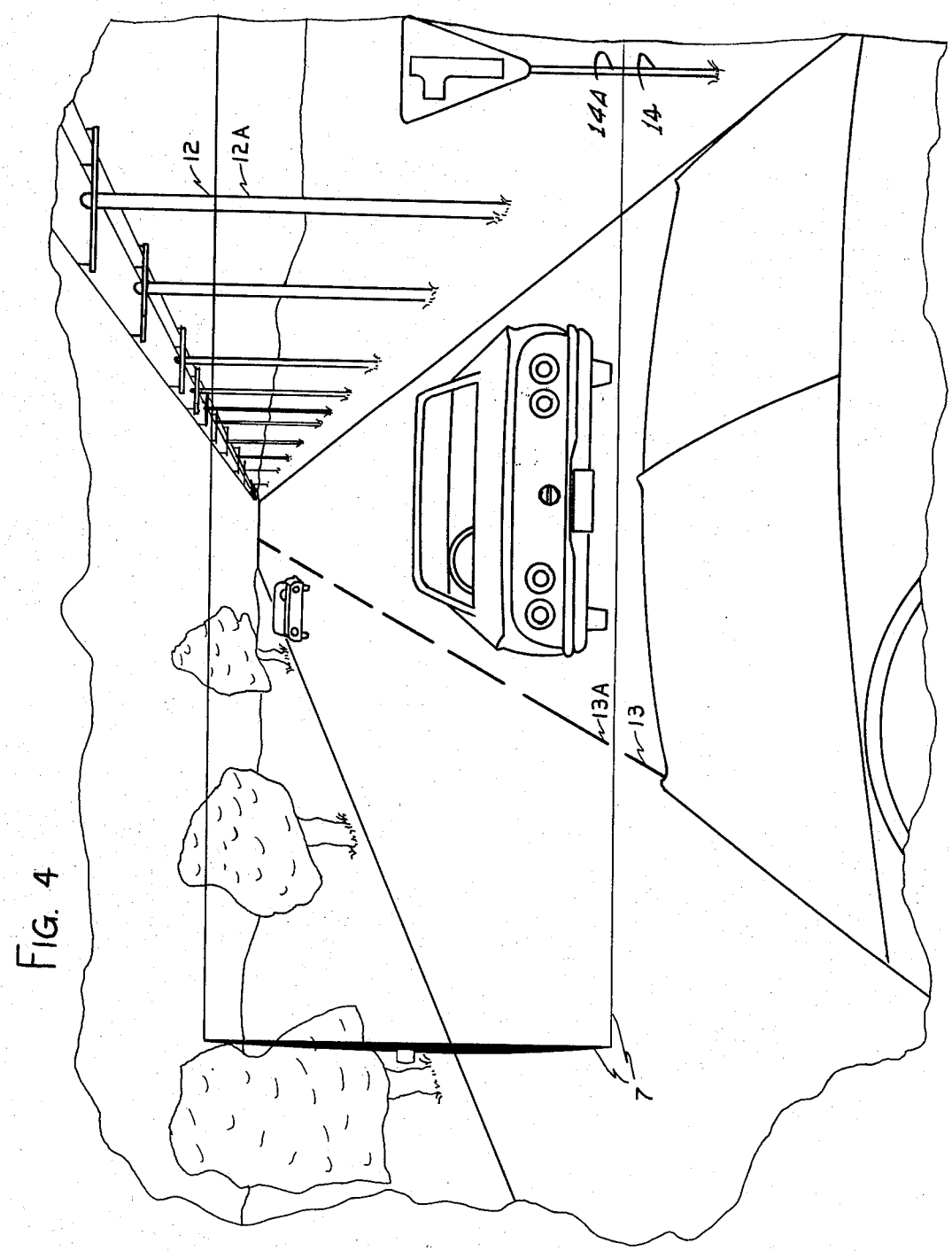
FIG. 4 is a view looking forward, as visualized by the driver.

(See FIG. 4.) The motor vehicle driver selects visual reference points 12, 13, and 14 (telephone pole, road center line, traffic sign, etc.) as seen through the motor vehicle windshield. The driver then proceeds to adjust the mirror 7 until the reflected image of the road ahead 12A, 13A, and 14A is integrated and superimposed (horizontally and vertically aligned) upon the visual reference points. It should be noted that proper adjustment of the mirror 7 will produce an illusion that the motor vehicle driver is viewing the road ahead through his windshield. This view is the reflected image from the mirror 3.

Figure 5:
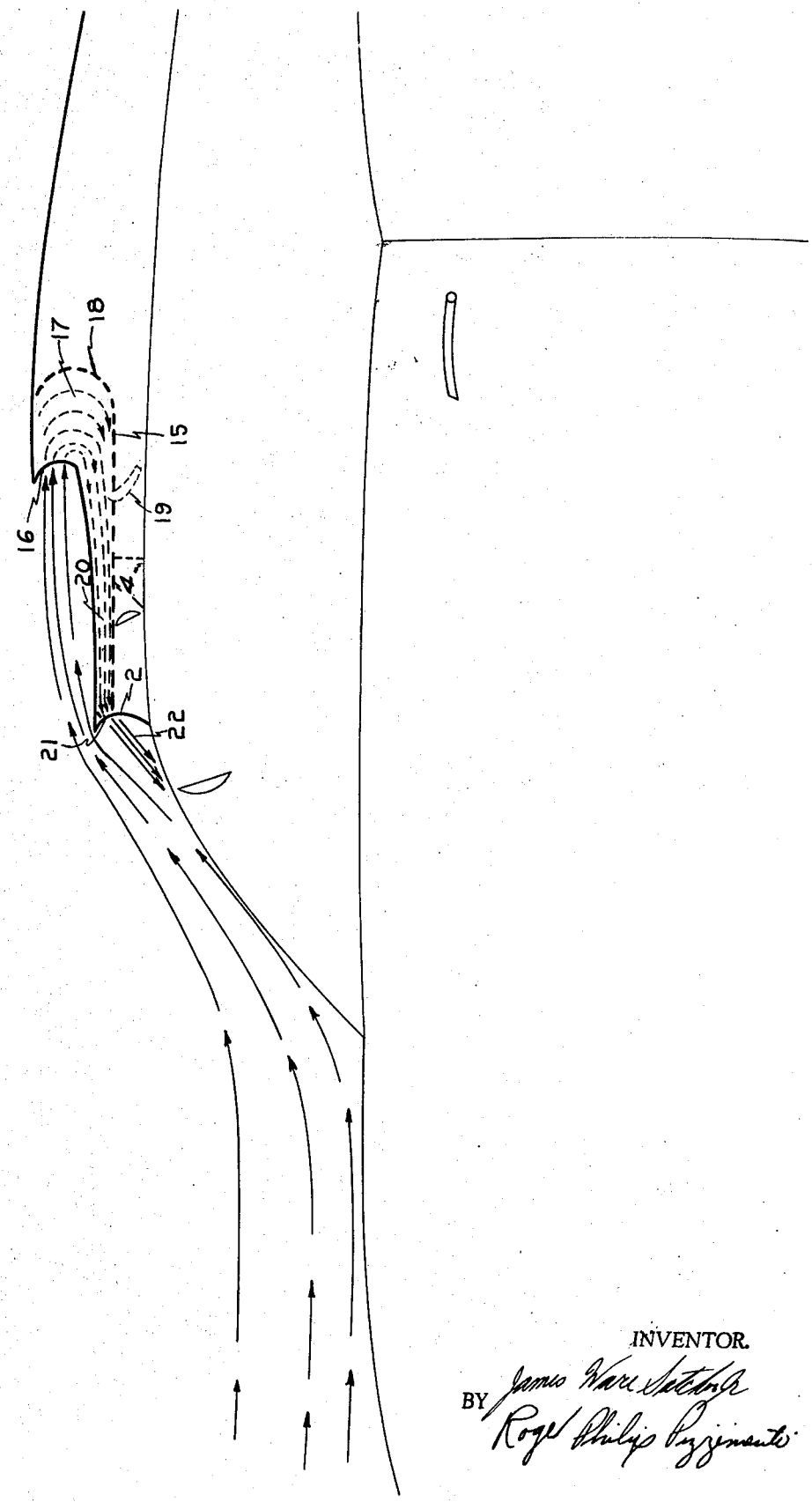
FIG. 5 is a partial side view of the safety road viewer showing the air-stream pattern which is generated when the motor vehicle is in forward movement.

(See FIG. 5.) Moisture (rain, sleet, snow, etc.) is prevented from entering the forward view chamber opening 2 by utilization of the aerodynamic duct 15. During the forward movement of the motor vehicle the duct inlet 16 permits air and moisture to enter the high pressure air chamber 17. Moisture entering the high pressure air chamber is propelled against the aft wall 18 of the high pressure air chamber 17 and evacuated through the drain duct 19. The moisture-free air then enters the high velocity air chamber 20 which increases the velocity and redirects the air through the duct outlet 21 (in a downward direction) to form an air boundary layer 22 in front of the forward view opening 2. This air boundary layer repels any attempt of rain, sleet, snow, etc. from entering the forward view chamber 4.

Defrost capabilities are incorporated in both the high pressure air chamber 17 and the forward view chamber 4. Heated air is ducted from the standard source of the motor vehicle. The defrost control is mounted on the motor vehicle dashboard. A glare-free flat black coating (not illustrated) is applied to the entire inner metallic surfaces of the forward view chamber 4. This coating serves to isolate the reflected image which is being transmitted from the mirror 3 to the driver viewing mirror 7.

Figure 1:
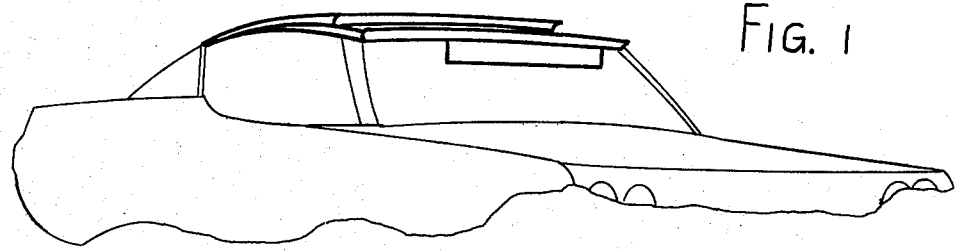
FIG. 1 is a perspective view.
Figure 2:
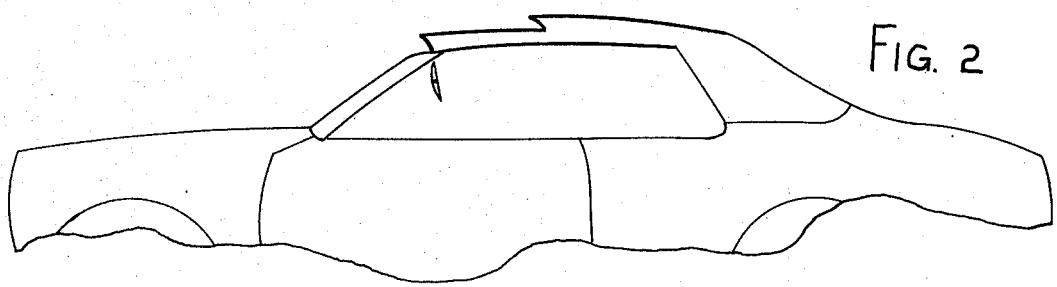
FIG. 2 is a side view of the safety road viewer configuration of the motor vehicle roof structure.
Figure 3:
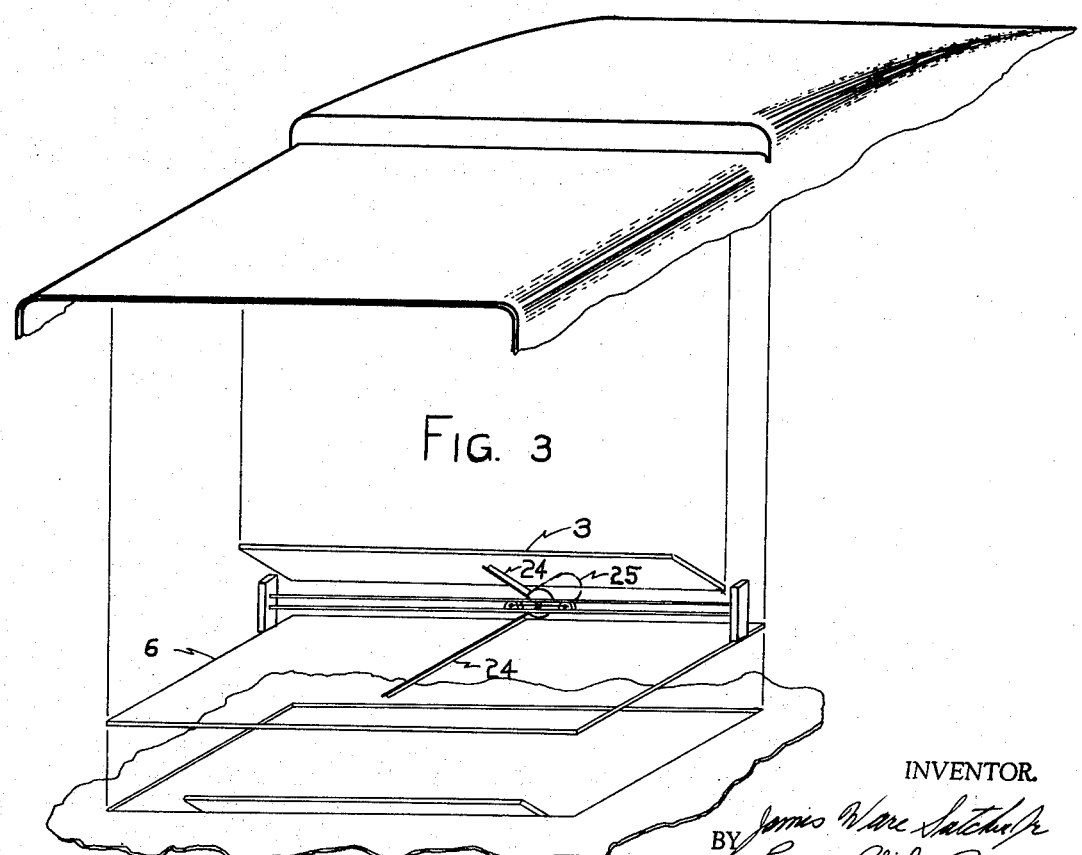
FIG. 3 is an expanded detailed view, in perspective, of the safety road viewer.

(See FIG. 3.) A reciprocating wiper 24 is incorporated for the purpose of removing moisture from both the clear glass panel 6 and mirror 3. The reciprocating wiper 24 is actuated by a motor 25 which receives power from the electrical system of the motor vehicle. The reciprocating wiper control is mounted on the motor vehicle dashboard.

We claim:

1. A forward view mirror system for a motor vehicle comprising first and second mirrors sequentially arranged to provide the driver with a view of the road ahead, said first mirror being located above the driver's head in a forward view chamber and positioned to reflect an image of the road in front of the vehicle to said second mirror, said second mirror being located directly in front of the driver and adjustably mounted so that the image of the road reflected by said first mirror will pass through a clear glass panel which forms the lower forward section of said forward view chamber and will be reflected by said second mirror to the eyes of the driver, a high pressure air chamber located above said forward view chamber and including a forwardly directed duct inlet which collects air with precipitation during the forward movement of the vehicle and directs the precipitation to a drain duct located in the lower aft wall of said high pressure air chamber, said duct inlet redirects moisture-free air through a high velocity air chamber to a duct outlet located above the forward view opening of said forward view chamber, said duct outlet being shaped to direct moisture-free air from said high velocity air chamber downwardly in front of said forward view opening to create an air boundary layer which prevents precipitation from reaching said first mirror, a reciprocating wiper consisting of two wiper blades which horizontally scans and removes all moisture from the reflecting surface of said first mirror and surface of said clear glass panel within said front view chamber.

* * * * *